June 17, 1941.   C. L. McGAVERN   2,246,450
HYDRAULIC TRANSMISSION
Filed June 6, 1940   3 Sheets-Sheet 1
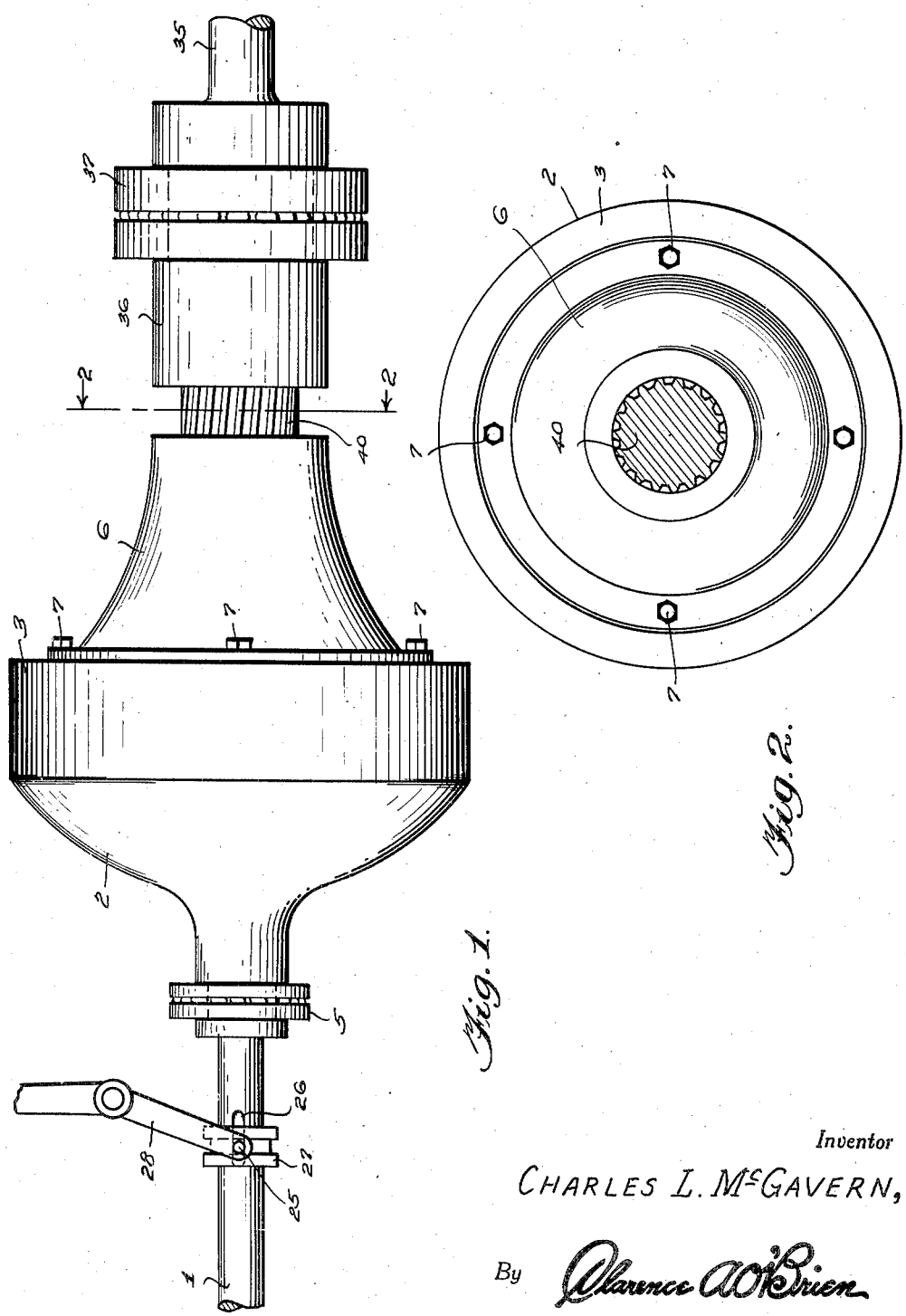
Inventor
CHARLES L. McGAVERN,
By *Clarence A. O'Brien*
Attorney June 17, 1941. C. L. McGAVERN 2,246,450
HYDRAULIC TRANSMISSION
Filed June 6, 1940 3 Sheets-Sheet 2

Inventor
CHARLES L. McGAVERN,
By Clarence A. O'Brien
Attorney

June 17, 1941.                C. L. McGAVERN                2,246,450
                            HYDRAULIC TRANSMISSION
                              Filed June 6, 1940                3 Sheets-Sheet 3

Inventor
CHARLES L. McGAVERN,
By Clarence A. O'Brien
Attorney

Patented June 17, 1941

2,246,450

UNITED STATES PATENT OFFICE 2,246,450

HYDRAULIC TRANSMISSION

Charles L. McGavern, Olean, N. Y.

Application June 6, 1940, Serial No. 339,182

4 Claims. (Cl. 74—295)

The present invention relates to new and useful improvements in hydraulic transmissions particularly for motor vehicles although it will be understood, of course, that a transmission constructed in accordance with the present invention may be used for any other purpose for which it may be found adapted and desirable.

The primary object of the invention is to provide, in a manner as hereinafter set forth, a hydraulic transmission embodying a novel construction, combination and arrangement wherein the speed ratio of the driven member to the driving member may be manually controlled or automatically controlled by the load on the former.

Other objects of the invention are to provide a hydraulic transmission of the character described which will be comparatively simple in construction, strong, durable, highly efficient and reliable in use, compact, light in weight and which may be manufactured and installed at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in side elevation of a hydraulic transmission constructed in accordance with the present invention.

Figure 2 is a cross sectional view, taken substantially on the line 2—2 of Fig. 1.

Figure 3:
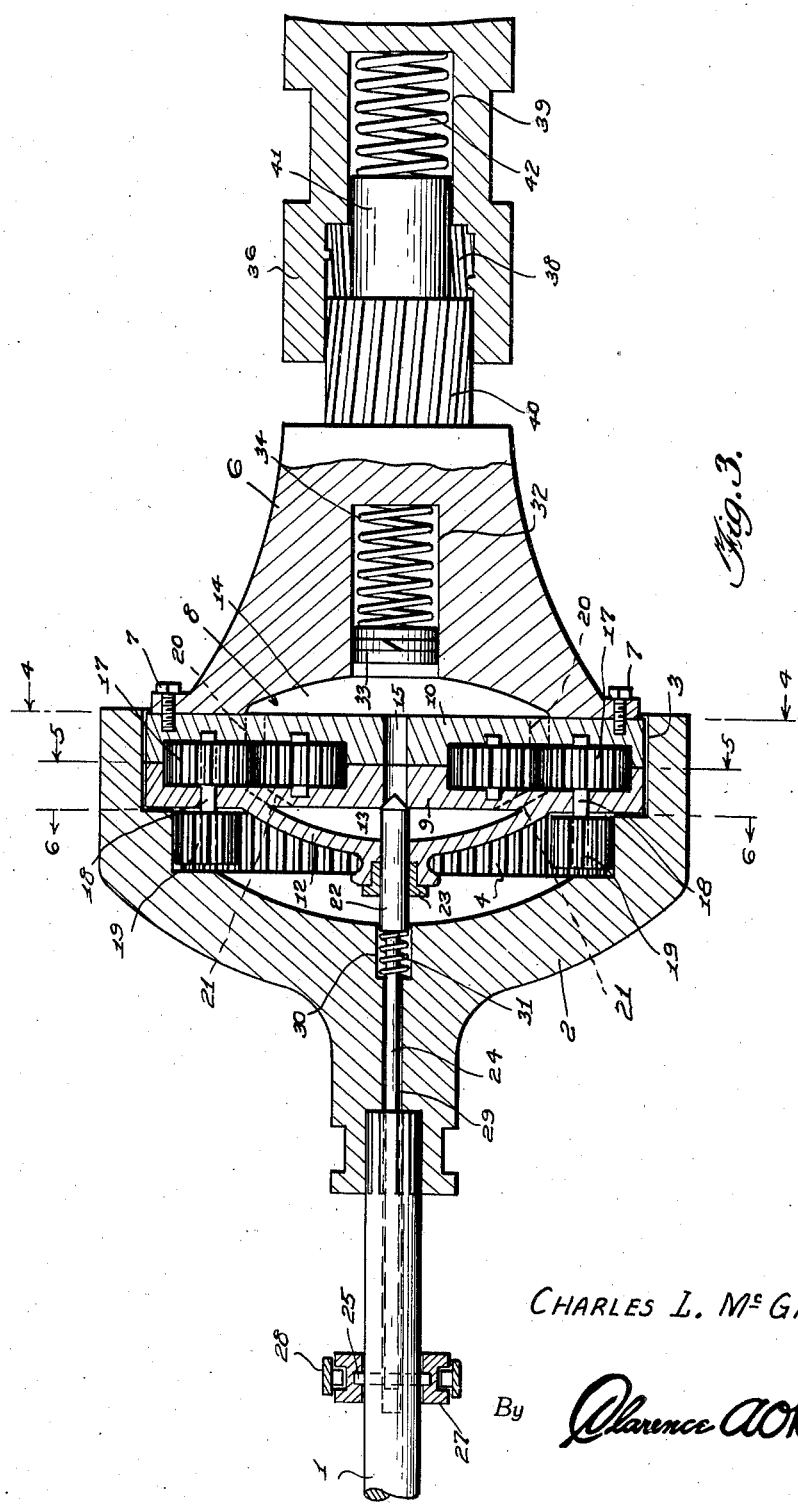
Figure 3 is a view in longitudinal section through the transmission.
Figure 4:
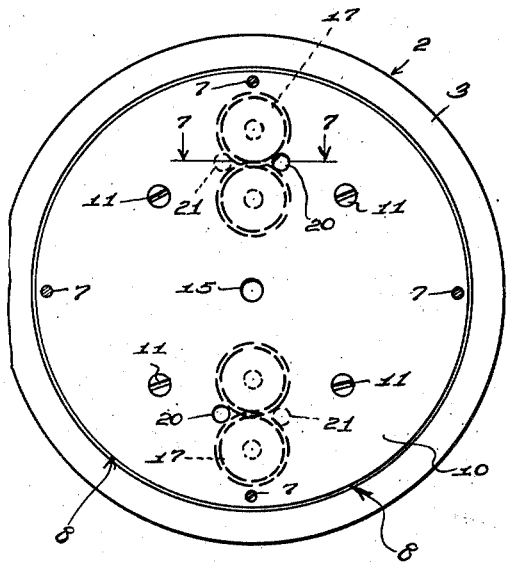
Figure 4 is a cross sectional view, taken substantially on the line 4—4 of Fig. 3.
Figure 5:
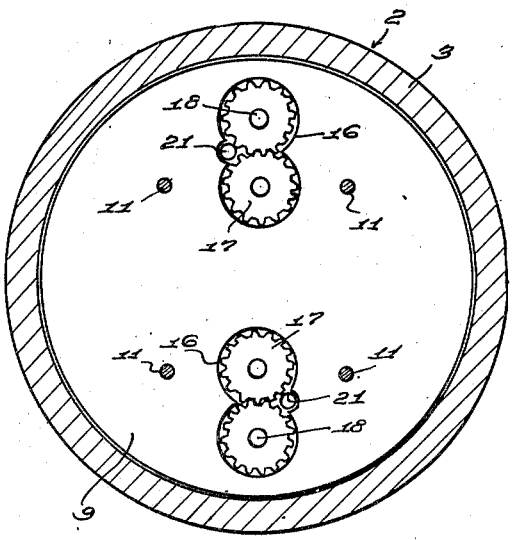
Figure 5 is a cross sectional view, taken substantially on the line 5—5 of Fig. 3.
Figure 6:
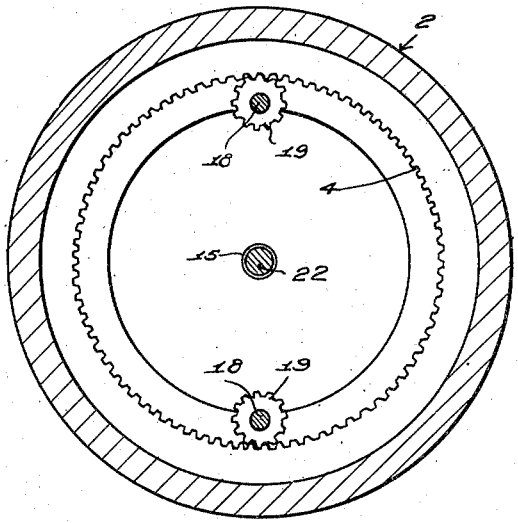
Figure 6 is a cross sectional view, taken substantially on the line 6—6 of Fig. 3.
Figure 7:
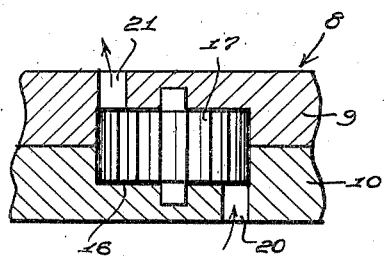
Figure 7 is a detail view in horizontal section, taken substantially on the line 7—7 of Fig. 4.

Referring now to the drawings in detail, it will be seen that the embodiment of the invention which has been illustrated comprises a drive shaft 1 which is actuated by the engine (not shown) of the vehicle. Fixed on one end portion of the drive shaft 1 is a flywheel 2. The flywheel 2 includes a cylindrical open end portion 3. Within the flywheel 2, adjacent the cylinder 3, is an annular, internally toothed gear 4. The forward end portion of the flywheel 2 is journaled in a suitable bearing 5.

Mounted in alignment with the flywheel 2 is a rotary and longitudinally movable driven member 6 of suitable metal. Bolted at 7 on the forward end of the driven member 6 is a case which is designated generally by the reference numeral 8, said case being rotatable and longitudinally movable in the cylindrical portion 3 of the flywheel 2. The case 8 includes metallic front and rear disks 9 and 10, respectively, which are suitably secured together, as at 11. Projecting forwardly from the disk 9 is a dome 12 providing a fluid chamber 13. The forward end of the member 6 has formed therein a concavity providing a fluid chamber 14. A centrally located fluid passage 15 through the case 8 establishes communication between the chambers 13 and 14.

The opposed faces of the disks 9 and 10 have formed therein complemental recesses providing chambers 16 in which gear pumps 17 are mounted for operation. The shafts 18 of one of the gears of the pumps 17 extend forwardly from the case 8 into the flywheel 2 and have fixed thereon pinion gears 19 which are engaged with the gear 4 for actuation thereby. Ports 20 establish communication between the chamber 14 and the chambers 16 on one side of the gear pumps 17. Ports 21 establish communication between the fluid chamber 13 and the chambers 16 on the other side of the gear pumps 17.

Mounted for longitudinal sliding movement in the dome 12 is a valve 22 which is engageable in the forward end portion of the fluid passage 15 for controlling same. A suitable packing 23 is provided on the dome 12 for the valve 22. The valve 22 is mounted on one end of a stem 24 which extends slidably into the drive shaft 1. Mounted transversely on the forward end portion of the stem 24 is a pin 25 which is operable in a longitudinal slot 26 provided therefore in the drive shaft 1. Mounted on the pin 25 for sliding movement on the drive shaft 1 is a grooved collar 27. A manually operable lever or pedal 28 is operatively connected to the collar 27 for opening the valve 22.

The rear end portion of the bore 29 is enlarged in a manner to provide a chamber 30 which accommodates the forward portion of the valve 22. The chamber 30 also accommodates a coil spring 31 or other resisting medium which yieldingly urges the valve 22 toward closed position. It may be well to here state that the slot 26 in which the pin 25 is operable positively limits the movement of the valve 22 under the influence of the coil spring 31.

The driven member 6 has formed longitudinally therein a centrally located expansion chamber 32 which communicates with the fluid chamber 14. A piston 33 is operable in the expansion chamber 32. A coil spring 34 in the expansion chamber 32 yieldingly supports the piston 33.

The reference numeral 35 (see Fig. 1) designates a driven shaft having an enlargement or head 36 on its forward end. The head 36 is journaled in a suitable bearing 37. Extending into the head 36 from the forward end thereof is a spirally threaded socket 38. Also formed longitudinally in the head 36 is a cylinder 39 which communicates with the socket 38. The socket 38 is for the reception of a spirally threaded shank 40 which projects rearwardly from the driven member 6. Projecting rearwardly from the shank 40 is a reduced plunger 41 which is operable in the cylinder 39. A coil spring 42 or other resisting medium in the cylinder 39 yieldingly resists rearward movement of the plunger 41 in said cylinder.

It is thought that the operation of the transmission will be readily apparent from a consideration of the foregoing. Briefly, with the valve 22 open, the flywheel 2 rotates while the member 6 remains stationary, the pumps 17, which are actuated by the gears 4 and 19, circulating the fluid from the chamber 14 through the ports 20 and 21, the chamber 13 and back to said chamber 14 through the passage 15. As the valve 22 is moved toward closed position the circulation of the fluid through the passage 15 is restricted. The resistance thus created to the pumps 17, which is transmitted to the gears 19, causes the member 6 to turn with the flywheel 2. When the valve 22 is fully closed the fluid can no longer circulate and in this manner the pumps 17 are locked. As the gears 19 are also locked against movement on the gear 4 a direct drive is had between the members 2 and 6. From the foregoing it will be seen that by operating the valve 22 the speed at which the member 6 will be driven may be progressively raised and lowered as desired. The chamber 32 permits expansion of the fluid and, in addition, maintains the circulating system of the transmission substantially full at all times.

With valve 22 in closed position and should the load on the drive shaft increase sufficiently as to stop or retard the rotation of the driven shaft over the speed of rotation of the member 6 which is now locked to the fly wheel, the spirally pitched threads 40 coacting with the spirally pitched threads 38 will bring about movement of the member 6 toward the drive shaft and unseat the valve 22 and thereby interrupt the direct drive between the fly wheel and the member 6 until the load is again reduced whence the spring 42 acts to restore the member 6 to its initial position, again seating the valve to bring about direct drive between the fly wheel and the member 6.

It is believed that the many advantages of a hydraulic transmission constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

1. A hydraulic transmission comprising a driving member, a driven member rotatable relative to said driving member, the driven member having a fluid chamber therein, a case mounted on the driven member and rotatable in the driving member, said case having a fluid chamber therein and further having a passage therein connecting the first and second named chambers, pumps mounted in the case for circulating the fluid, gears operatively connecting said pumps to the driving member for actuation thereby, and a valve slidably mounted in the driving member and engageable in the passage for regulating the circulation of the fluid and controlling the operation of the pumps.

2. A hydraulic transmission of the character described comprising a driving member, a driven member, said driven member having a fluid chamber therein, a case mounted on the driven member and rotatable in the driving member, said case including a pair of complemental disks, a dome on one of said disks providing a fluid chamber, the disks having a centrally located passage therethrough establishing communication between the chambers for the passage of the fluid, gear pumps mounted in the case between the disks for circulating the fluid through the passage between the chambers, gears operatively connecting the pumps to the driving member for actuation thereby, and a manually operable valve slidably mounted in the dome and engageable in the passage for controlling the circulation of the fluid therethrough.

3. A hydraulic transmission comprising a driving member, a driven member rotatable in said driving member and having spaced fluid chambers therein, said driven member further having a passage therein connecting the chambers for the flow of fluid therebetween, pumps in the driven member for circulating the fluid, means operatively connecting said pumps to the driving member for actuation thereby, the driven member further having an expansion chamber therein communicating with one of the first named chambers, and means in the expansion chamber for yieldingly resisting the entrance of the fluid thereinto.

4. A hydraulic transmission comprising, in combination, a driving member, a driven member rotatable and slidable in said driving member, said driven member having a fluid circulating system therein, pumps in the driven member for circulating the fluid through the system, means operatively connecting said pumps to the driving member for actuation thereby, a stationary valve mounted in the driving member for controlling the circulation of the fluid in the driven member, and load controlled means operatively connected to the driven member for moving same toward or away from the valve for regulating the circulation of the fluid.

CHARLES L. McGAVERN.